United States Patent Office 3,407,212
Patented Oct. 22, 1968

3,407,212
PROCESSES FOR CYCLIZING COMPOUNDS HAVING THE 8A CARBAMYL, 2-OXO-NAPHTHALENE MOIETY TO PYRROLIDONES AND REACTING THE LATTER WITH A SULFONYL HALIDE
Wataru Nagata, Hyogo Prefecture, Japan, assignor to Shionogi & Co., Ltd., Osaka, Japan
No Drawing. Original application May 12, 1965, Ser. No. 464,264, now Patent No. 3,345,385, dated Oct. 3, 1967. Divided and this application Oct. 19, 1965, Ser. No. 516,808
Claims priority, application Japan, Apr. 4, 1960, 35/20,125; Apr. 6, 1960, 35/20,723
2 Claims. (Cl. 260—326.3)

This application is a division of application S.N. 464,264, filed May 12, 1965, now Patent No. 3,345,385.

This invention relates to compositions of matter, particularly organic compounds and their methods of preparation, and more especially to intermediates useful in the total synthesis of steroids and to the preparation of such intermediates. More particularly, the present invention also relates to novel total synthetic methods of preparing steroids and intermediates therefor, including steps in which the reactions are originally novel.

Specifically, in a first aspect thereof, this invention relates to a novel total synthesis of the steroids represented by the formula:

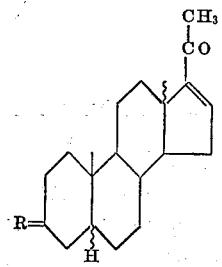

wherein R represents

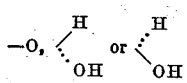

and the ripple mark (ʃ) is a generic indication of both the α- and β-configurations, and intermediates thereof.

In a second aspect thereof, this invention relates to an originally novel process for the introduction of a methyl radical into an angular position, such process being generally applicable in the organic chemistry field, and especially in the synthetic production of steroidal compounds.

In a third aspect thereof, this invention relates to an originally novel process for the introduction of a cyano radical into an annular position, such process being again generally applicable in the organic chemistry field, and especially in the synthetic production of steroidal compounds.

In a fourth aspect thereof, this invention relates to an originally novel process for the fission of the C—N bond in an angular carbamoyl radical, this process being also generally applicable in the organic chemistry field, and especially in the synthetic production of steroidal compounds.

Accordingly, a basic object of the present invention is to provide a novel total synthetic method for the production of steroids and intermediates therefor, with further other objects corresponding to the aforesaid aspects, respectively.

These and other objects and the manner in which they are accomplished will become apparent to those conversant with the art from the following description of the general class of compounds and the several specific examples and methods of obtaining them presented.

The position-numbering employed herein for the steroidal type compounds is that generally accepted in steroid chemistry, i.e.,

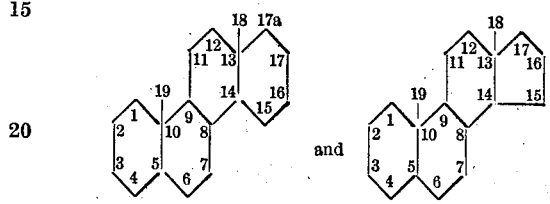

unless some other numbering is specially mentioned.

The synthesis is generically outlined in the following reaction scheme:

Part I (I) →Step I→ (II)

→Step II→ (III)

Part II (III) →Step III→ (IV)

Part III (IV)

↓ Step IV

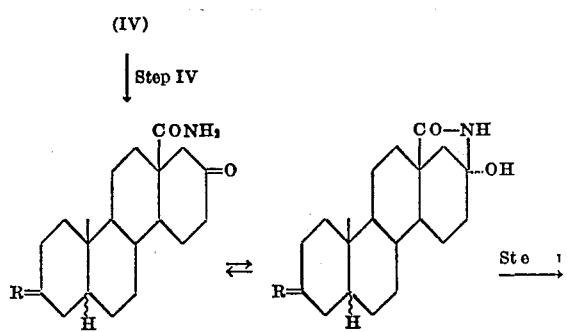

Part III''

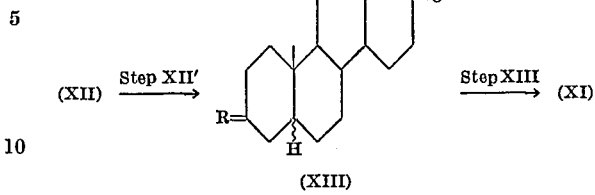

Part IV

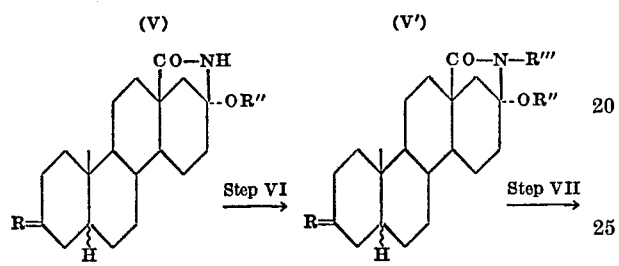

Part V (XIV)

↓ (Step XIV)

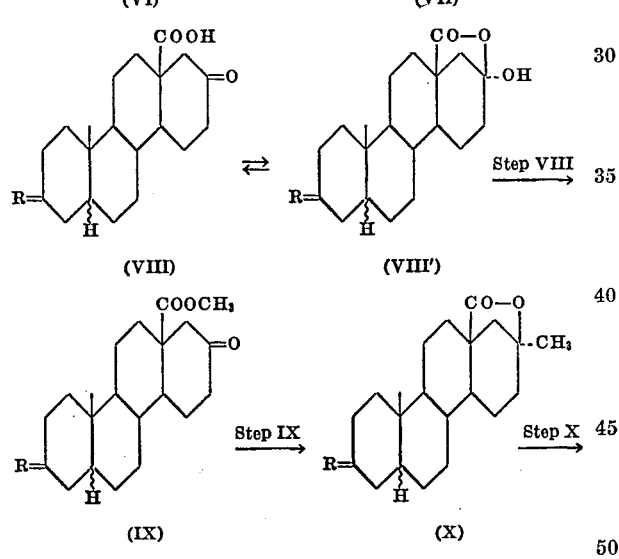

In the foregoing reaction scheme, R represents $$=O, \begin{matrix} H \\ \cdots OH \end{matrix} \text{ or } \begin{matrix} H \\ \cdots OH \end{matrix}$$

R' represents a lower alkyl radical containing from 1 to 3 carbon atoms such as methyl, ethyl, propyl, etc., R'' represents a lower alkyl or alkanoyl containing from 1 to 4 carbon atoms such as methyl, ethyl, propyl, butyl, acetyl, propionyl, butyryl, etc., R''' represents a lower alkyl-sulfonyl, aryl-sulfonyl or aralkyl-sulfonyl radical such as methylsulfonyl, ethylsulfonyl, propylsulfonyl benzenesulfonyl, toluenesulfonyl, xylenesulfonyl, benzylsulfonyl, phenethylsulfonyl, etc., and the ripple mark (⌇) represents either α- or β-configuration. In this connection, it should be understood that the reaction scheme shows the substantial order of the steps in the total synthesis, modifications and equivalents—including possible detours—being omitted. Thus, any hydroxyl and/or oxo radicals in the disclosed compounds are intended also to represent such radicals properly protected, when necessary, although—for the sake of simplicity—such radicals are shown only in unprotected form in the reaction scheme. In other words, the showing of an hydroxyl radical is intended to represent a free hydroxyl or a protected hydroxyl such as acylated hydroxyl, and the showing of an oxo radical is intended to represent a free oxo or a protected oxo such as ketalized oxo.

When necessary, the protection of a hydroxyl radical or an oxo radical may be effected by ordinary methods known to those skilled in the art. When the said free radicals (—OH or =O) are undesirably affected by any re-

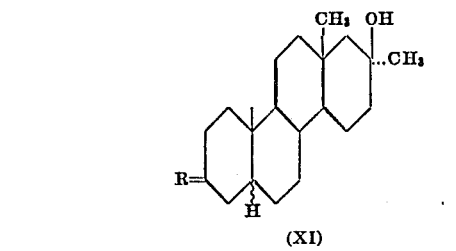

Part III'

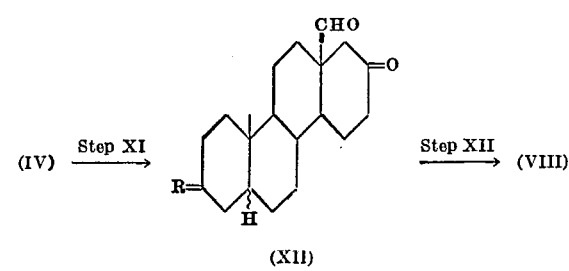

agent in any step in the course of the synthesis, it is necessary to protect them in advance of executing the step. A hydroxyl radical is usually protected by acylation, which can be carried out by treating the hydroxyl compound with an acylating agent in the presence of a condensing agent. For instance, the hydroxyl compound may be converted into the corresponding acetoxy compound by treating with acetic anhydride in the presence of pyridine or p-toluenesulfonic acid. Subsequent deacylation, if desired, can be easily carried out by treatment of the acyloxy compound with alkali, usually while heating. The generally employed method for protecting an oxo radical is ketalation, which can be realized by the treatment of an oxo compound with an alcohol in the presence of a condensing agent. For instance, the ketalation may be carried out by heating the oxo compound with ethanol or ethyleneglycol in the presence of p-toluenesulfonic acid in an organic medium such as benzene or toluene. Subsequent deketalation, if desired, can be easily carried out by heating the ketalized compound with acid.

The starting material of the present invention is 2-alkoxy - 10a - methyl - 5,6,8,9,10,10a,11,12 - octahydrochrysen - 8 - one (Formula I) which is described and claimed in the copending application of W. Nagata and S. Hirai, Ser. No. 837,328, filed Sept. 1, 1959. A compound of Formula I can be prepared by reacting 6 - alkoxy-2-tetralene (Formula A) with vinyl ethyl ketone or equivalent thereof in the presence of a condensing agent such as alkali metal, alkali metal hydride, alkali metal alcoholate, alkali metal amide, amine or organic ammonium hydroxide and reacting the resulting tautomer of 1-methyl-7-alkoxy - 1,2,3,4,9,10-hexahydrophenanthren-2-one and 1-methyl-7-alkoxy-2,3,4,4a,9,10 - hexahydrophenanthren-2-one (Formula B) with vinyl methyl ketone or equivalent thereof in the presence of such a condensing agent. In the latter reaction, when carried out under a relatively mild condition, 1,6 - dimethyl-6-hydroxy-9-oxo-2,3-(2'-alkoxy-7',8' - dihydro-6',5' - naphtho) - $\Delta^2$ - bicyclo - [3.3.1] nonene (Formula C) is obtained as a reaction product, but this is easily transformed to the Compound I by heating in the presence of a condensing agent, as aforesaid. The said steps can be represented by the following scheme:

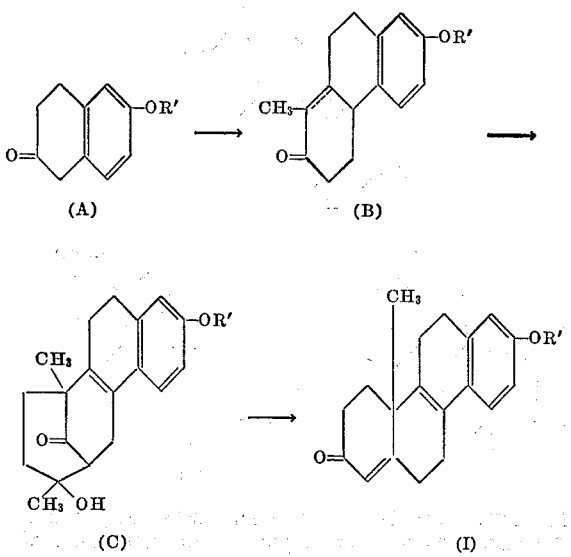

wherein R' represents a lower alkyl radical containing from 1 to 3 carbon atoms such as methyl, ethyl, propyl, etc. For instance, 2 - methoxy - 10a - methyl - 5,6,8,9,10, 10a,11,12 - octahydrochrysen - 8 - one (Formula I, R'=CH₃) is prepared by refluxing mildly 6 - methoxy-2-tetralone (Formula A, R'=CH₃) with an equimolar quantity of β-diethyl-aminoethyl ethyl ketone in anhydrous ether in the presence of sodium hydride and reacting the resulting mixture containing a tautomer of 1 - methyl-7-methoxy - 1,2,3,4,9,10 - hexahydrophenanthren - 2 - one (Formula B, R'=CH₃) with an equimolar quantity of β-diethylaminoethyl methyl ketone at about 0 to 5° C., followed by refluxing. The production of the other starting compounds (Formula I, R'=C₂H₅ or C₃H₇) is carried out in analogous manner. However, the disclosure relating to the production of the starting materials (I) stated above should not be understood to be my sole invention.

The synthesis according to this invention consists of five parts; the first part is concerned with the reduction of the double bonds in the initial chrysene nucleus; the second part is concerned with the cynation at the 13-position; the third part is concerned with the conversion of the introduced cyano radical to the methyl radical, accompanied by the introduction of a hydroxyl radical and a methyl radical into the 17-position in preparation for the next following step; the fourth part is concerned with dehydration in the 6-membered ring D; and the fifth part is concerned with degradation of the 6-membered ring D to the five-membered ring D.

The first part comprises the step relating to the reduction of Compound I, with or without previous partial reduction, to the enol ether compound (Formula II) (step I) and the step of hydrolysis of Compound II accompanied by rearrangement to the unsaturated keto compound (Formula III) (step II).

In step I, the reaction may be carried out by treating Compound I, with or without previous partial reduction, with an alkali metal or an alkaline earth metal such as lithium, sodium, potassium or calcium dissolved in liquid ammonia or a homolog thereof, namely an organic amine such as trimethylamine or triethylamine, in the presence of a water-containing or water-free lower alkanol such as methanol, ethanol, 2 - methoxyethanol or 2-ethoxyethanol, with or without another organic solvent such as ether, tetrahydrofuran or dioxane, at a temperature lower than room temperature (about 15 to 30° C.).

In step II, the reaction may be carried out by treating Compound II with an acid such as hydrochloric acid, sulfuric acid or acetic acid, usually in an organic solvent, with refluxing. Although Compound II can be intermediarily isolated, it is preferable to carry out steps I and II successively without its isolation from the viewpoint of economy in the synthesis.

The product of this part of the invention can be generically represented by Formula III. When Compound I, 2-alkoxy - 10a - methyl - 5,6,8,9,10,10a,11,12 - octahydrochrysen - 8 - one itself, is used as starting compound of this part, i.e., without previous partial reduction, 3β - hydroxy-D-homo - 18 - nor - 5a - androst - 13(17a)-en-17-one is obtained. When 2 - alkoxy - 10a - methyl - 5,6,8, 9,10,10a,11,12-octahydrochrysen-8-one is catalytically reduced by treatment with hydrogen in the presence of platinum or palladium catalyst and then the resulting 2-alkoxy-10a-methyl-5,6,6aβ, 7,8,9,10,10a,11,12-decahydrochrysen-8-one is subjected to the reactions of steps I and II, 3α-hydroxy-D-homo - 18 - nor - 5β - androst - 13(17a)-en-17-one is obtained as product. The same product can be obtained from 2 - alkoxy - 8α - hydroxy - 10a - methyl-5,6,6aβ,7,8,9,10,10a,11,12 - decahydrochrysene, prepared by reducing 2 - alkoxy - 10a - methyl - 5,6,6aβ,7,8,9,10, 10a,11,12 - decahydrochrysen-8-one with lithium aluminum hydride, according to the method in steps I and II. Similarly, 2 - alkoxy - 10a, - methyl - 5,6,6aβ,7,8,9,10, 10a,11,12 - decahydrochrysen - 8 - one 8 - ethylene ketal, which is obtained by the ketalation of 2 - alkoxy-10a-methyl - 5,6,6aβ,7,8,9,10,10a,11,12 - decahydrochrysen-8-one, can be converted into D-homo - 18 - nor-5β-androst-13(17a) - en - 3,17 - dione 3 - ethylene ketal and the latter can be easily deketalated to the corresponding free keto compound. These and other associated conversions are shown in the following schemes:

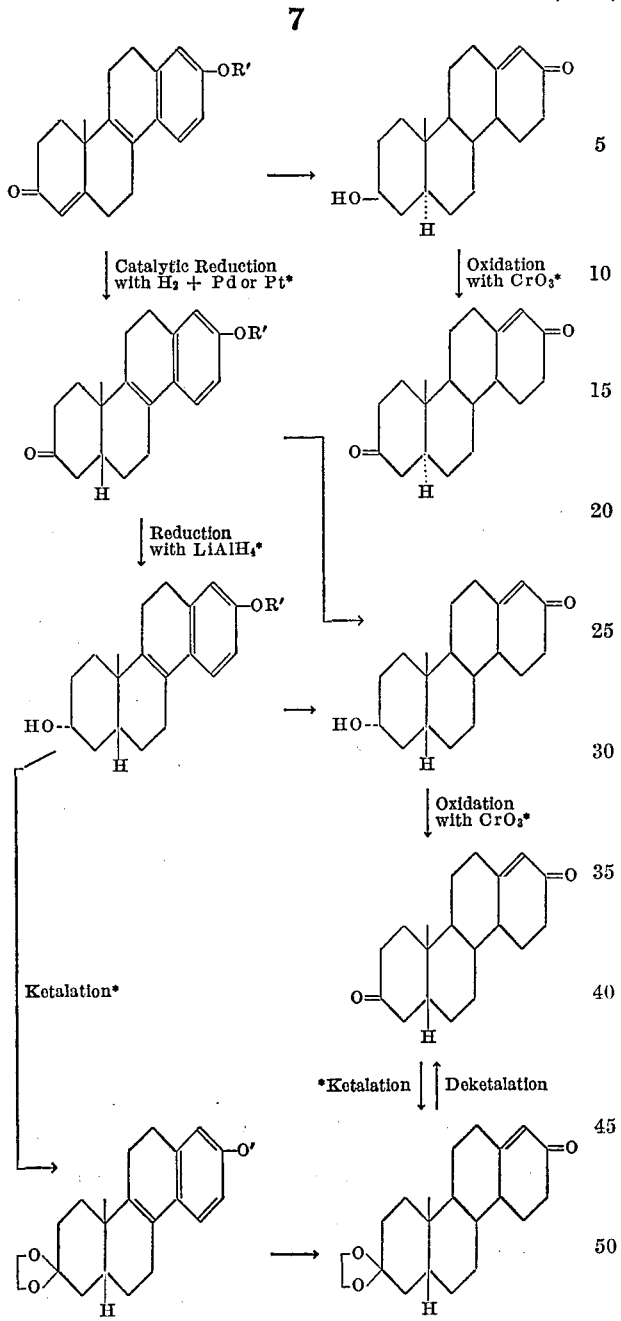

These steps are carried out in per se conventional manner.

The subsequent steps, with or without protection of the hydroxyl radical or the oxo radical, can be carried out in precisely the same manner with each of the compounds obtained according to the preceding reaction schemes.

When compound I is subjected to the reactions in steps I and II, after protection of the 8-oxo radical by ketalation or reduction of the 8-oxo radical to the 8-hydroxyl radical by treatment with lithium aluminum hydride, the double bond in the ring A remains in the resultant product, without being reduced.

Relating to this part of the synthesis, it should be noted that the compound having the most thermodynamically stable steric configuration, i.e. the same steric configuration as in the natural steroids, is obtained as a main product. Although the 8,14-isomer (B:C-trans) is sometimes by-produced in the reaction, it can be readily separated by recrystallization, chromatography or a combination thereof.

The second part of the present invention comprises the step relating to the cyanation of compound III at the 13-position to form the angular cyano compound (Formula IV) (step III), with or without accompanying hydrolysis of compound IV to the angular acid amide (Formula V or V').

In step III, the reaction may be carried out by treating compound III with a cyanating agent. Alkali metal cyanide, alkaline earth metal cyanide, hydrocyanic acid complex or a combination of hydrocyanic acid and base, especially a base acting as a Lewis acid, can be used as cyanating agent. Illustrative of a hydrocyanic acid complex is lithium aluminum cyanide or cyano magnesium halide or the like. Suitable bases for combination with hydrocyanic acid include, for example, trimethylamine, triethylamine, $Al(X)_3$ or $Al(X)(X')_2$, wherein X and X' each represent lower alkyl or alkoxy radicals such as methyl, ethyl, propyl, butyl, iso-butyl, tert-butyl, methoxy, ethoxy, propoxy, iso-propoxy, butoxy, iso-butoxy or tert-butoxy. The reaction is usually carried out in a suitable inert solvent such as a lower alkanol, dioxane, dimethylformamide, ether, tetrahydrofuran, benzene or toluene at about 20 to 100° C. for 2 to 12 hours. Although the reaction is essentially cyanation, the hydrolysis of compound IV may simultaneously occur, depending upon reaction conditions, to afford the acid amide. The latter is a tautomer of γ-keto-acid amide (Formula V) and γ-lactam-ol (Formula V'). However, in solid phase, it can be proved by measurement or IR-spectrum that the lactam form is predominant. The tendency toward occurrence of the hydrolysis is enhanced by the use of a strongly basic agent such as alkali metal cyanide or by the presence of water in the reaction mixture. To avoid the hydrolysis by moderation of basicity, as well as to promote the cyanation reaction, ammonium halide, acetic acid, ammonium acetate, alkali bisulfite or the like may advantageously be used as catalyst, especially when strongly basic agents are employed. Moreover, the hydrolysis is entirely avoidable, when a combination agent of hydrocyanic acid and base acting as a Lewis acid is used.

The reaction product of this part of the invention is a mixture of compound IV and steric isomer thereof (Formula D) and/or the compound V or V' and steric isomer thereof (Formula E or E').

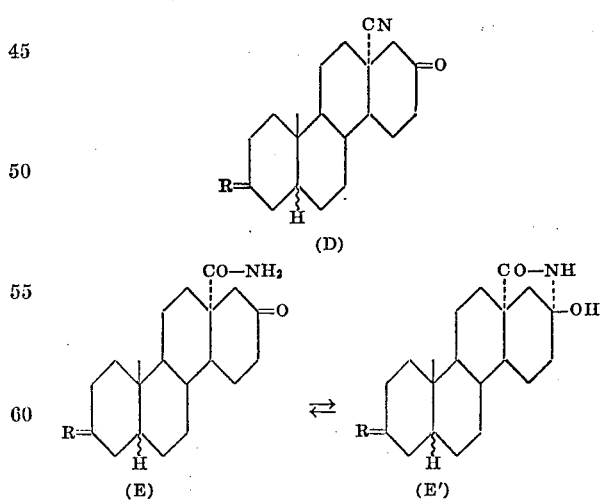

The mixture can be separated into each compound or steric isomer by chromatography or recrystallization. Alternatively, the separation may be carried out in a suitable subsequent stage, if difficulty is encountered at the present stage. Although the description of the subsequent steps is made with reference to 13β compounds, the corresponding 13α compounds can be obtained from the compounds D and E or E' by the application of the same reactions in such steps.

In this connection, it should be noted that the reaction in the step III is originally novel and is generally applicable for the cyanation of the angular position. In other words, the reaction can generally apply to compounds having a conjugated enone structure or equivalent thereof, of which the β-position corresponds to an angular position of a polyhydroisocyclic compound. Such compounds may be exemplified as follows:

2,3,4,4a,5,6,7,8-octahydronaphthalen-2-one,
7-hydroxy-2,3,4,4aα,4bβ,5,6,7,8,8aα,9,10-dodecahydro-phenanthren-2-one,
2,7-dihydroxy-1,2,3,4,4aα,4bβ,5,6,7,8,8aα,9-dodecahydro-phenanthren-9-one,
3-hydroxy-D-homo-18-nor-androst-13(17a)-en-17-one,
D-homo-18-nor-androst-13(17a)-en-3,17-dione,
3-hydroxy-D-homo-18-nor-androsta-9(11),13(17a)-dien-17-one,
3,9α-dihydroxy-D-homo-18-nor-androst-13(17a)-en-17-one,
3,9α-dihydroxy-D-homo-18-nor-androsta-5,13(17a)-dien-17-one,
3-hydroxy-D-homo-18-nor-androsta-5,9(11),13(17a)-trien-17-one,
3,17-dihydroxy-D-homo-18-nor-androst-12-en-11-one,
3,16-dihydroxy-18-nor-androst-12-en-11-one,
3-hydroxy-18-nor-pregna-1,3,5(10),13(17)-tetraen-20-one and
3-hydroxy-13-ocetoxy-18-nor-pregna-1,3,5(10)-trien-20-one.

In these compounds, the unspecified position of the mentioned substituents, may be in α- or β-configuration. Although the last compound set forth above does not have the structure of a conjugated enone, it is an addition product of acetic acid with 3-hydroxy-18-nor-pregna-1,3,5(10),13(17)-tetraen-20-one and the acetoxy radical is as active as conjugated enone. In the reaction, a cyano radical is introduced so as to form an axial bond for the ring having the enone structure. Therefore, when the enone is involved in an outside ring such as the ring A or the ring D of a steroid, the reaction yields a mixture of cis-cyano and trans-cyano compounds, of which each cyano radical is axial to the outside ring. On the contrary, when the enone is involved in an intermediate ring such as the ring B or the ring C of a steroid, only one steric isomer results so as to cause trans-juncture. Accordingly, for example, when the reaction is applied to the 11-oxo-18-nor-Δ12-steroids, a cyano radical is introduced stereospecifically into the 13β-position. This is extremely advantageous for the synthesis of 11-oxidized steroids such as prednisolone, prednisone, dexamethasone or hydrocortisone.

The third part of the invention comprises the step relating to the hydrolysis of compound IV to the angular acid amide (V or V') (step IV); the steps for the cleavage of the C—N bond of the angular carbamoyl radical in compound V consisting of (i) the step relating to the alkylation of compound V to the ether or the ester (Formula VI) (step V), followed with or without (ii) the succeeding step relating to the sulfonylation of compound VI to the N-sulfonylated compound (Formula VII) (step VI), and (iii) the step relating to the hydrolysis of the compound VII to the angular carboxylic acid (Formula VIII or VIII') (step VII); the step relating to the methylation of compound VIII to the methyl ester (Formula IX) (step VIII); the step relating to the lactonization of compound IX to the lactone (Formula X) (step IX); and the step relating to the reductive fission of the lactone bond in compound X to the angular methyl compound (Formula XI) (step X).

In step IV, the reaction may be carried out by treating the compound IV with alkali in a suitable solvent. Usually, it is executed by heating compound IV with alkali metal hydroxide such as sodium hydroxide or potassium hydroxide in methanol-water. As stated above, this step can be carried out simultaneously with step III according to the reaction condition.

In connection with the thus-obtained compound V or V', it should be noted that, according to general knowledge, an angular amide should be hydrolyzable by conventional alkali treatment. This procedure can not be successfully carried out with compounds V or V'. This is ascribable to steric hindrance and electronic condition. However, this difficulty is overcome by the present invention. Thus, when the hydroxyl radical of compound V or V' is etherized (this is a ketalation in a sense) and the compound thus fixed in the structure of compound V, the ether group acts on the carbonyl radical at the β-position as "driving force" for the addition of reagents acting on the carbonyl radical and for the subsequent fission of the C—N bond. This may be one of 1,4-elimination under fragmentation. Hydrolysis of such angular carbamoyl radical in a fused cyclic compound is carried out for the first time by the invention. In this connection, while a similar effect may be expected from the introduction of a negative atom or radical such as halogen or an ester group instead of an ether group, this is practically unsuitable. Further improvement is, moreover, accomplished by the invention. The fission of the C—N bond is accelerated by substitution of the hydrogen atom attached to the nitrogen atom in the bond with a radical such as an alkyl-sulfonyl, aryl-sulfonyl or aralkyl-sulfonyl radical, because such substituents hinder the proton-donation of the nitrogen atom to the carbonyl radical by their inductive effect. Consequently, splitting of the C—N bond is facilitated, and therefore hydrolysis can proceed under milder conditions and with a higher yield (substantially quantitatively). The partial reaction scheme may be represented as follows:

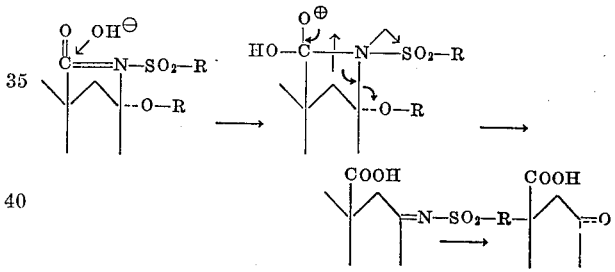

The reactions in steps V to VII are based upon the acid discovery.

In step V, an etherification reaction may be carried out by treating compound V or V' with an alcohol such as methanol, ethanol or propanol in the presence of an acid such as hydrochloric acid, sulfuric acid or p-toluenesulfonic acid with or without azeotropic procedure. Also, an esterification reaction may be carried out by treating compound V or V' with an acid chloride or an acid anhydride in the presence of an alkaline condensing agent.

In step VI, the reaction may be carried out by treating compound VI obtained in the preceding step with an alkyl-sulfonyl, aryl-sulfonyl or aralkyl-sulfonyl halide such as methylsulfonyl, ethylsulfonyl, propylsulfonyl, benzenesulfonyl, toluenesulfonyl, xylenesulfonyl, benzylsulfonyl or phenylethylsulfonyl halide in the presence of a catalyst in a non-polar solvent such as benzene, toluene or xylene. As catalysts, the reagents which have ability to substitute active hydrogen for metal can be employed, for example alkali metals, alkali metal hydrides and alkali metal amides.

It is clear from the foregoing description that step V relating to etherification or esterification of the hydroxyl radical is essential to perform the hydrolysis of the angular amide having a rigid neopentyl carbon-arrangement, but step VI relating to the sulfonylation of the amino radical is not always necessary. However, in general, the hydrolysis of the angular amide according to subsequent step VII, without the previous sulfonylation of step VI, can proceed only with a side reaction under highly drastic conditions to afford the product in a lower yield. Accordingly, it is preferred to go through the sulfonylation step VI.

In step VII, the reaction can be carried out by treating compound VII with alkali such as sodium hydroxide or potassium hydroxide in a suitable solvent such as methanol, ethanol, ethyleneglycol or dioxane while heating to afford quantitatively the compound VIII or VIII'.

Thus obtained angular carboxylic acid VIII tends to form a hemiketal lactone structure VIII' with a β-oxo radical similar to the angular amide compound V mentioned above. However, compound VIII is easily esterified and fixed in a ketocarboxylic type.

In step VIII, the reaction may be carried out by treating compound VIII with diazomethane in an inert organic solvent such as dioxane, ether, benzene or toluene to afford compound IX.

Compound IX may be prepared directly from compound VII by solvolysis with alcoholic alkali or alkali alkoxide.

In step IX, the reaction may be carried out by treating compound IX with a Grignard reagent such as methylmagnesium iodide in an inert organic solvent such as tetrahydrofuran or ether at about room temperature.

In step X, the reaction may be carried out by treating compound X with a metal hydride such as lithium aluminum hydride, sodium aluminum hydride, magnesium aluminum hydride, aluminum hydride or lithium aluminum alkoxyhydride in an inert organic solvent such as ether or tetrahydrofuran at about room temperature or higher, and converting the resultant reduction product to the semicarbazone, hydrazone or azine thereof, followed by decomposition of the latter by heating in the presence of an alkaline catalyst such as sodium, sodium methoxide, sodium ethoxide, sodium hydroxide or potassium hydroxide, in the presence or absence of an inert organic solvent such as methanol, ethanol, diethyleneglycol or triethyleneglycol.

The third part of the invention may be modified in part. Thus, compound IV can be converted through the angular aldehyde (Formula XII) into compound VIII. This procedure consists of the step of reduction of compound IV, followed by the hydrolysis to compound XIII (step IV'), and of the step of oxidation of compound XII to compound VIII (step XII).

In step IV', the reaction can be carried out by treating compound IV with a metal hydride such as lithium aluminum hydride, sodium aluminum hydride, magnesium aluminum hydride, aluminum hydride or lithium aluminum alkoxyhydride in an inert organic solvent such as tetrahydrofuran or ether at about room temperature or higher, and then treating the resultant reduction product with alkali or subjecting the same to alumina chromatography. Prior to the application of this step to compound IV, the oxo radical in the compound should be changed into the ketal for protection from reduction.

In step XII, the reaction may be carried out by treating compound XII with an oxidizing agent such as chromic acid, permanganate, silver oxide, hydrogen peroxide or organic peracid. Especially, a mixture of chromic acid and inorganic acid such as sulfuric acid in inert organic solvent such as acetone can be suitably sused as oxidizing agent in this step. If necessary, the oxidation may be carried out under the protection of the other oxidizable substituents in conventional manner.

Alternatively, the conversion of compound XII to compound XI can be effected through the angular methyl compound (Formula XIII). This procedure consists of the step of reductive methylation of compound XII to compound XIII (step XII') and the step of 17-methylation of compound XIII to compound XI (step XIII).

In step XII', the reaction may be carried out by changing compound XII to the semicarbazone, hydrazone or azine thereof and decomposing the latter with heating in the presence of an alkaline catalyst such as sodium, sodium methoxide, sodium ethoxide, sodium hydroxide or potassium hydroxide, in the preseence or absence of an inert organic solvent such as methanol, ethanol, diethyleneglycol or triethyleneglycol.

In step XIII, the reaction may be carried out by treating compound XI with a Grignard reagent such as methyl magnesium iodide in an inert organic solvent such as ether, tetrahydrofuran or benzene.

The said third part including partial modifications are generally applicable in the steroid field, and compounds having a cyano radical at the angular position can be converted into the corresponding angular methyl compounds according to the steps in this part of the present invention.

As the product in this part of the invention, there is obtained the 13β-methyl compound XI from the 13β-cyano compound IV, while the 13α-methyl compound (Formula F)

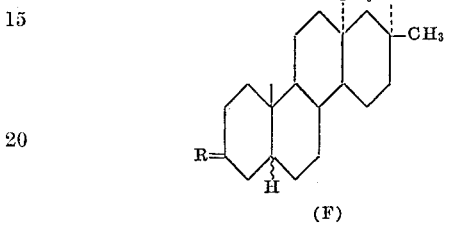

(F)

is obtained from the 13α-cyano compound D.

The fourth part of the present invention comprises the step relating to the dehydration of compound XI to the Δ¹⁷-methyl compound (Formula XIV (step XI).

In step XI, the reaction may be carried out by treating the compound XI with dehydrating agents such as pyridine and phosphorus chloride. As the result of the reaction, there is obtained the compound XIV as a tautomeric mixture.

The fifth part of the invention comprises the step relating to the oxidative fission of the 6-membered ring D in compound XVI to form the keto aldehyde (Formula XV) (step XIV) and the step relating to the dehydrative ring closure of compound XV to the final product (Formula XVI) (step XV).

In step XIV, the reaction may be carried out by treating compound XIV with oxygen-ozone in an inert organic solvent such as chloroform, methanol or ethanol and then treating the resulting ozonide with zinc and acetic acid. As the result of the reaction, there is obtained a mixture of compound XV and its isomer (Formula G).

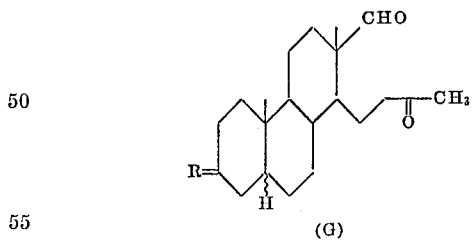

(G)

Although the mixture may be treated in the following step without separation, it can be separated by chromatography at the present stage.

In step XV, the reaction may be carried out by treating compound XV with triethylamine and acetic acid in an inert organic solvent such as benzene, toluene or xylene in a sealed tube.

The final product XVI is a 3-substituted pregn-16-en-20-one. More concretely, some of the final products may be exemplified as follows: 3α-hydroxy-5β-, 13β-pregn-16-en-20-one (Formula H) and its 3-acylate, 3β-hydroxy-5α, 13β-pregn-16-en-20-one (Formula I) and its 3-acylate, 5β, 13β-pregn-16-en-3,20-dione (Formula J) and its 3-ketal, 5α,13β-pregn-16-en-3,20-dione (Formula K) and its 3-ketal, 3α-hydroxy-5β,13α-pregn-16-en-20-one (Formula L) and its 3-acylate, 3β-hydroxy-5α,13α-pregn-16-en-20-one (Formula M) and its 3-acylate, 5β,13α-pregn-16-en-3,20-dione (Formula N) and its 3-ketal, and 5α,13α-pregn-16-en-3,20-dione (Formula O) and its 3-ketal:

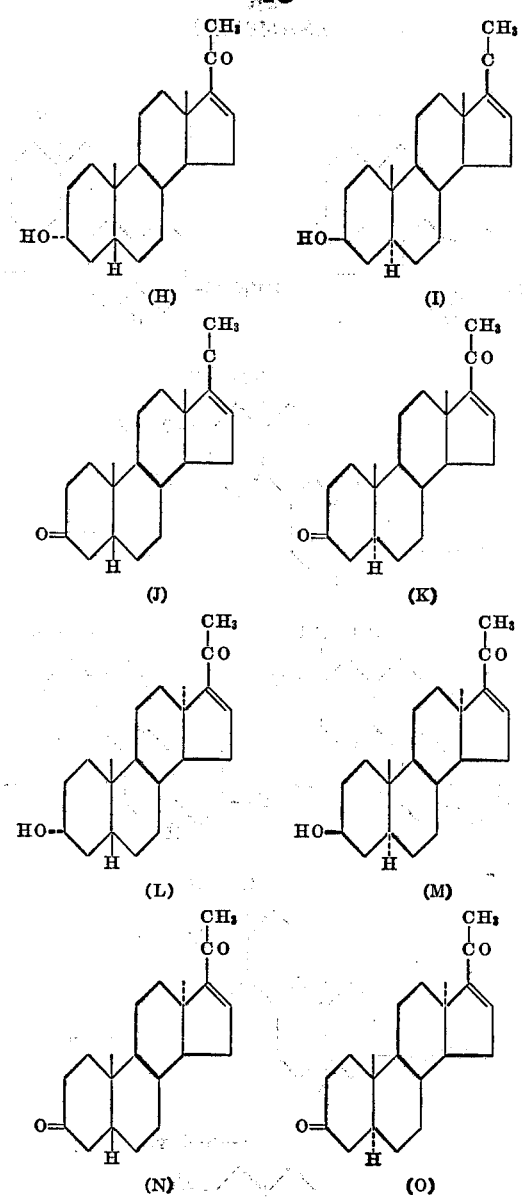

Among these products, 13β-methyl compounds have been isolated from human urine and can be converted into other steroids having medicinal effect per se according to the methods per se known to those skilled in the art. An illustrative example is shown as follows:

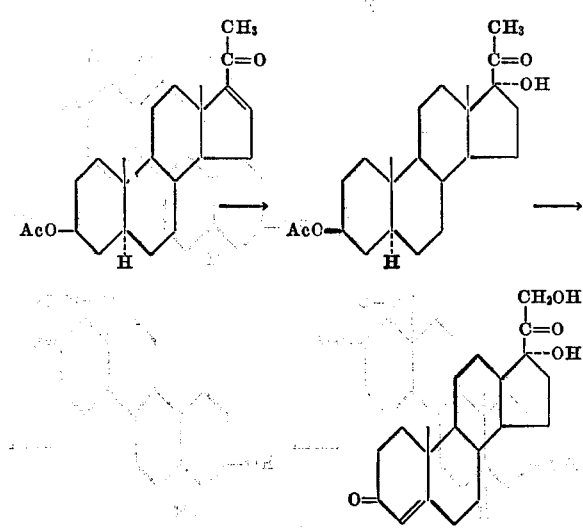

Namely, 3β - acetoxy - 5α-pregn-16-en-20-one may be changed into 3β,21-diacetoxy-17α-hydroxy-5α-pregn-16-en-20-one by the application of the methods described in Djerassi et al.: J.A.C.S. 76, 1722 (1954): Moffett et al.: J.A.C.S. 74, 2183 (1952): and Julian et al.: J.A.C.S. 72, 362 (1950), and the latter converted into cortexolone according to the methods described by Evans et al.: J.A.C.S. 4356 (1956); J. Pataki et al.: J.A.C.S. 74, 5615 (1952); and J. M. Chemerda et al.: J.A.C.S. 73, 4052 (1951).

The following examples illustrate methods of carrying out the present invention, but it is to be understood that these examples are given for purposes of illustration and not of limitation.

In the examples which follow, the abbreviations and symbols have the following significances:

"g." means gram(s);
"l." means liter(s);
"ml." means milliliter(s);
"kg." means kilogram(s);
"mg." means milligram(s);
"hr." means hour(s);
"M" means molar;
"Anal. Calcd." means analysis calculated, and
"ξ" (xi) means undetermined position.

Other abbreviations and symbols have conventional significances.

EXAMPLE 1

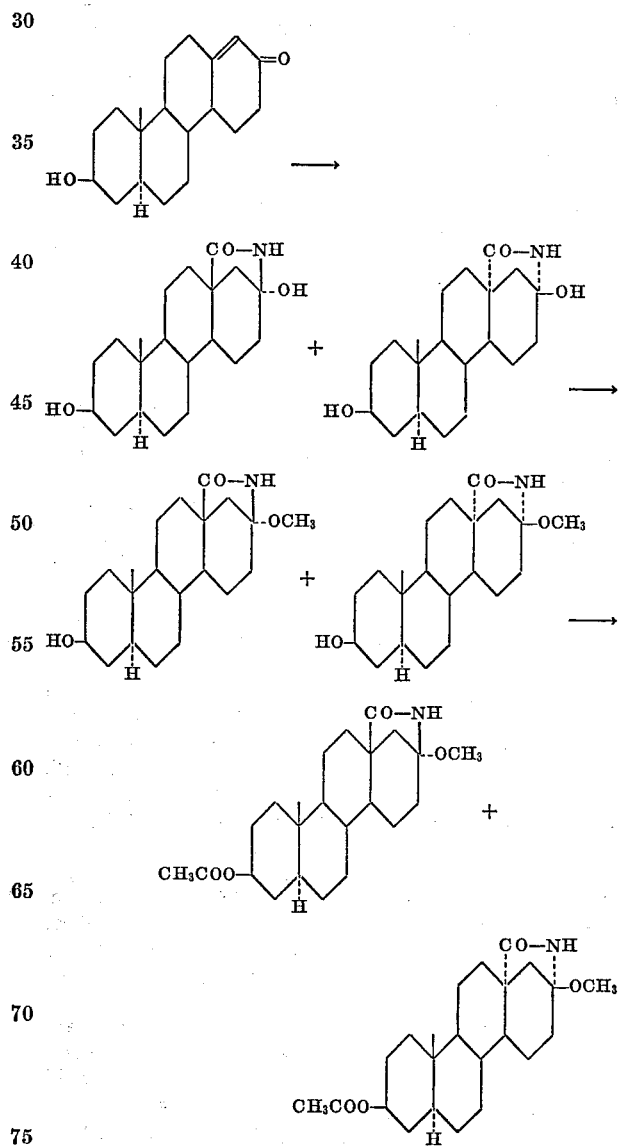

dl - 3β - hydroxy-D-homo-18-nor-5α-androst-13(17α)-en-17-one (14.33 g.) and potassium cyanide (6.45 g.) are dissolved in methanol (165 ml.) and water (33 ml.), and the mixture is refluxed for 2.5 hrs. under nitrogen atmosphere. Evaporating the mixture in vacuo, there are obtained crude products (15.82 g.). The crude products (10.4 g.) are dissolved in anhydrous methanol (50 ml.), and 34% methanolic HCl is added under cooling, and the mixture is allowed to stand for 2 days at room temperature. After removal of methanol, the residue is extracted with chloroform. The extract is washed with 2 N Na$_2$CO$_3$ and water, dried over Na$_2$SO$_4$ and the solvent is distilled off. The obtained crude other compound (10.7 g.) is then acetylated with pyridine (30 ml.) and acetic anhydride (20 ml.) in conventional manner to afford crude acetylated products (13.17 g.), which are chromatographed on alumina (Merck II) (250 g.).

After recovery of by-products (125 mg.) from eluates with petroleum ether-benzene (1:1–1:2), eluates with petroleum ether-benzene (1:2)-benzene-chloroform (9:1) give dl - 3β-acetoxy-17α-methoxy-17-amino-D-homo-5α-androstan-18-amide (1.91 g.), needles or columns, M.P. 260–262° C. (from chloroform-acetone-ether or acetone-ether). IR (Chloroform): 3475, 3300, 1724, 1710, 1700, 1253, 1025 cm.$^{-1}$. Analysis.—Calcd. for C$_{23}$H$_{35}$O$_4$N (389.52): C, 70.92; H, 9.06; N, 3.60. Found: C, 70.95; H, 9:10; N, 3.68.

Then, from eluates with benzene-chloroform (8:2–6:4) is obtained dl-3β-acetoxy-17β-methoxy-17-amino-D-homo-5α, 18α-androstan-18-amide (797 mg.), prisms, M.P. 237–240° C. (from acetone-ether). IR (Chloroform): 3424, 3241, 1727, 1708, 1252, 1028 cm.$^{-1}$. Analysis.—Calcd. for C$_{23}$H$_{35}$O$_4$N (389.52): C, 70.92; H, 9.06; N, 3.60. Found: C, 70.88; H, 9.05; N, 3.53.

Related compounds to dl-3β-acetoxy-17β-methoxy-17-amino-D-homo-5α,18α-androstan-18-amide are prepared in analogous manner: dl - 3β - acetoxy-17β-ethoxy-17-amino-D-homo-5α,18α-androstan-18-amide, prisms, M.P. 205–207° C. (from acetone-ether). IR (Nujol): 3285, 3100, 1737, 1711, 1233, 1028 cm.$^{-1}$. Analysis.—Calcd. for C$_{24}$H$_{37}$O$_4$N (403.54): C, 71.43; H, 9.24; N, 3.47. Found: C, 71.70; H, 9.25; N, 3.42.

dl - 3β-acetoxy-17β-hydroxy-17-amino-D-homo-5α,18α-androstan-18-amide, thin needles, M.P. 300–302° C. (from methanol). IR (Nujol): 3277, 3247, 1728, 1687, 1262, 1035 cm.$^{-1}$. Analysis.—Calcd. for C$_{22}$H$_{33}$O$_4$N (375.49): C, 70.37; H, 8.86; N, 3.73. Found: C, 70.45; H, 8.77; N, 3.54.

dl - 3β,17β-diacetoxy-17-amino-D-homo-5α,18α-androstan-18-amide, plates, M.P. 210–212° C. (from chloroform-ether). IR (Chloroform): 3438, 1727, 1710, 1252, 1022 cm.$^{-1}$. Analysis.—Calcd. for C$_{24}$H$_{35}$O$_5$N (417.53): C, 69.03; H, 8.45; N, 3.35. Found: C, 69.06; H, 8.31; N, 3.14.

Related compounds to dl-3β-acetoxy-17α-methoxy-17-amino-D-homo-5α-androstan-18-amide are prepared in analogous manner: dl-3β-acetoxy-17α-ethoxy-17-amino-D-homo-5α-androstan-18-amide, plates, M.P. 264–266° C. (from acetone-ether). IR (Nujol): 3210, 3075, 1730, 1690, 1237, 1227, 1024 cm.$^{-1}$. Analysis.—Calcd. for C$_{24}$H$_{37}$O$_4$N (403.54): C, 71.43; H, 9.24; N, 3.47. Found: C, 70.91; H, 9.14; N, 3.49.

dl - 3β - acetoxy-17α-hydroxy-17-amino-D-homo-5α-androstan-18-amide, long prisms, M.P. 264–267° C. (from chloroform-ether). IR (Chloroform): 3596, 3455, 3306, 1722, 1706, 1254, 1023 cm.$^{-1}$. Analysis.—Calcd. for C$_{22}$H$_{33}$O$_4$N (375.49): C, 70.37; H, 8.86; N, 3.73. Found: C, 70.01; H, 8.88; N, 3.53.

dl - 3β,17α-diacetoxy-17-amino-D-homo-5α-androstan-18-amide, needles, M.P. 254.5–256° C. (from chloroform-ether). IR (Chloroform): 3454, 1724, 1709, 1252, 1023 cm.$^{-1}$. Analysis.—Calcd. for C$_{24}$H$_{35}$O$_5$N (417.53): C, 69.03; H, 8.45; N, 3.35. Found: C, 68.73; H, 8.39; N, 3.15.

EXAMPLE 2

(A):

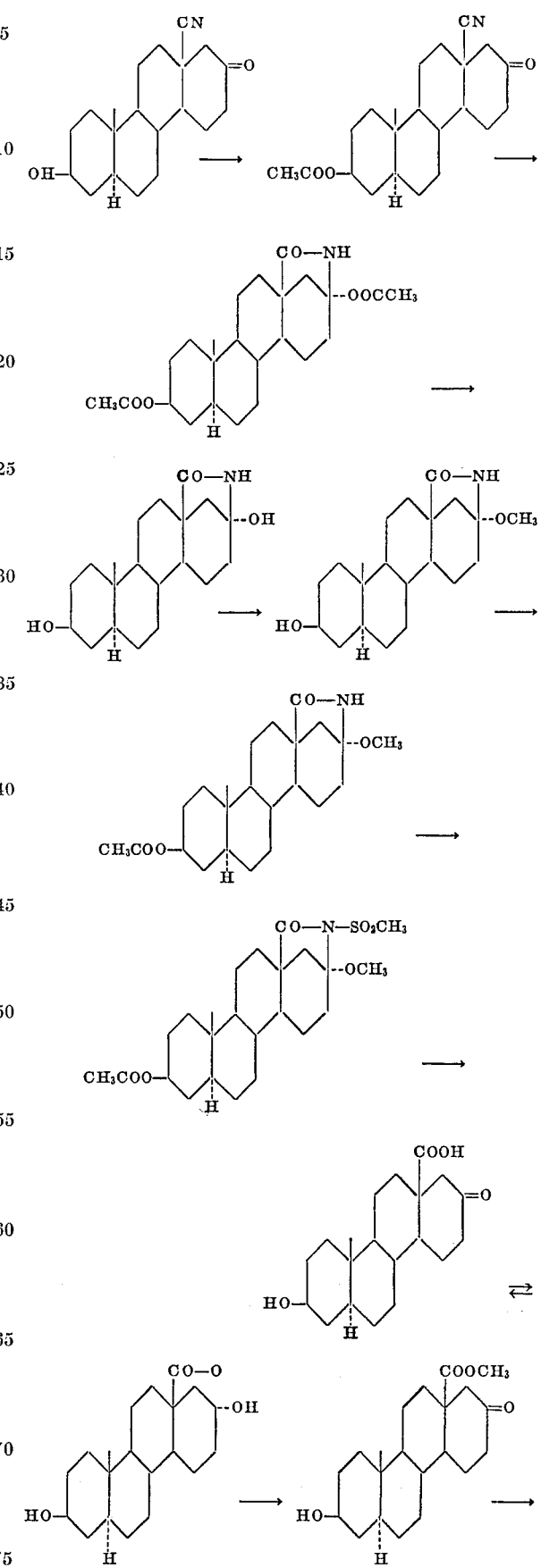

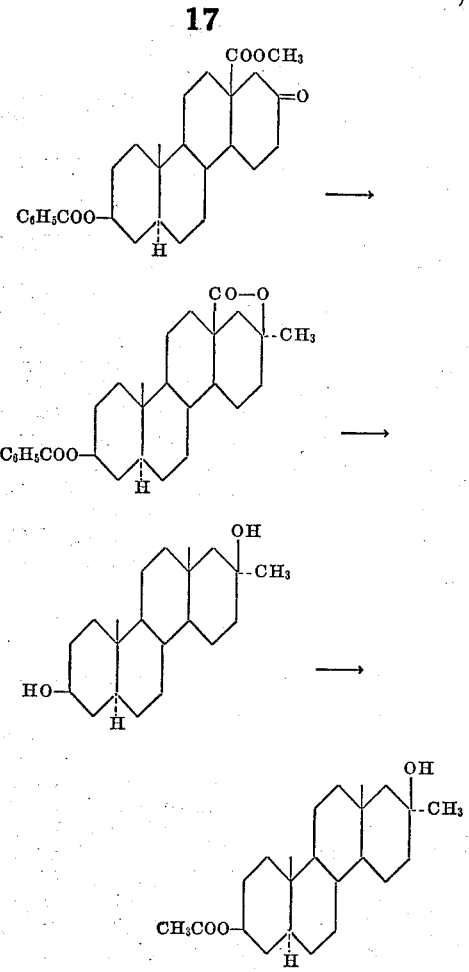

One hundred mg. of di-3β-acetoxy-13β-cyano-D-homo-5α-androstan-17-one prepared quantitatively from di-3β-hydroxy-13β-cyano-D-homo-5α-androstan-17-one by conventional acetylation with acetic anhydride and pyridine, is mixed with 60 mg. of potassium hydroxide and 6 ml. of methanol and refluxed for 0.5 hr. in a stream of nitrogen. Methanol is removed, 5 ml. of water and a small quantity of concentrated hydrochloric acid are added to the reaction mixture, crystals thereby separated out are filtered and dried at 100° C. on phosphorus pentoxide in vacuum. The crude products are dissolved in 3 ml. acetic anhydride, 20 mg. of p-toluenesulfonic acid monohydrate and 10 mg. of anhydrous sodium acetate added to the mixture, which is then evaporated in vacuo. The residue is treated with water and chloroform. The chloroform extract is washed with 2 N-sodium carbonate and water successively, then dried over sodium sulfate. After removal of the solvent, the residue (114.3 mg.) is chromatographed on alumina (3 g.). The crystals of dl-3β,17α-diacetoxy-17β-amino-D-homo-5α-androstan-18-oic acid lactam, 32.6 mg. are obtained from the eluates of petroleum ether-benzene (3:7)-benzene-benzene-chloroform (9:1 and 7:3) after recrystallization from acetone-ether.

dl-3β,17α-diacetoxy-17β-amino - D - homo-5α-androstan-18-oic acid lactam needles from chloroform-ether, M.P. 254.5–256° C.

IR: $\nu_{max.}^{CHCl_3}$ 3454, 1724, 1709, 1252, 1023 cm.$^{-1}$

Analysis.—Calcd. for $C_{24}H_{35}O_5N$ (417.53): C, 69.03; H, 8.45; N, 3.35. Found: C, 68.73; H, 8.39; N, 3.15.

Following eluates gives a crystalline compound regarded as a bis-type compound, 8.7 mg. of thin prisms, M.P. 300° C. (from chloroform-ether), by elution of benzene-chloroform (5:5 and 3:7)—chloroform-chloroform-methanol (99:1).

IR: $\nu_{max.}^{Nujol}$ 3485 (OH); 3220, 3100 (NH), 2222 (CN); 1733, 1240, 1026 (CH$_3$COO), 1692 (CONH) cm.$^{-1}$ Analysis.—Calcd. for $C_{44}H_{64}O_7N_2$ (732.96): C, 72.10; H, 8.80; N, 3.82. Found: C, 72.03; H, 8.63; N, 3.69.

dl-3β,17α-diacetoxy-17β-amino-D-homo-5α-androstan-18-oic acid lactam is quantitatively hydrolyzed by conventional alkaline treatment to give dl-3β,17α-dihydroxy-17β-amino-D-homo-5α-androstan-18-oic acid lactam. To a suspension of 502 mg. of the latter in 70 ml. of dehydrated methanol are added 41 g. of 49% (by weight) methanolic hydrochloric acid solution to dissolve crystals suspended. After allowing to stand 1 night, the reaction mixture is distilled to remove methanol under reduced pressure and extracted 3 times with chloroform. The combined extract is washed with 2 N-sodium carbonate solution, dried over sodium sulfate, then evaporated to dryness. The crude crystals, 529.6 mg. are obtained, and it gives pure crystals of dl-17β-amino-17α-methoxy-3β-hydroxy - D - homo - 5α-androstan-18-oic acid lactam, M.P. 229–231° C., 205.8 mg. by twice repeated recrystallization from acetone-ether. The mother liquor of the above recrystallization is concentrated under reduced pressure, and the residue, 280 mg. thus obtained, is methylated by methanol (5 ml.) and methanolic hydrochloric acid solution (10 ml.) and treated thereafter as usual. The crude crystals (300 mg.) thus obtained are chromatographed on 15 g. of Florisil to yield 78.3 mg. more of the same crystals as above.

di-17β-amino-17α-methoxy-3β-hydroxy-D - homo - 5α-androstan-18-oic acid lactam. M.P. 229–231° C., prismatic crystals from methanol, acetone and ether.

IR: $\nu_{max.}^{CHCl_3}$ 3607 (OH), 3425 (NH), 1697 (CONH), 1032 (CO) cm.$^{-1}$ Analysis.—Calcd. for $C_{21}H_{33}O_3N$ (347.48): C, 72.58; H, 9.57; N, 4.03. Found: C, 72.73; H, 9.72; N, 3.98.

dl-17β-amino-17α-methoxy-3β-hydroxy - D - homo-5α-androstan-18-oic acid lactam (284 mg.) is acetylated with acetic anhydride in pyridine to afford quantitatively dl-3β - acetoxy - 17α - methoxy - 17β-amino-D-homo-5α-androstan-18-oic acid lactam as needles or prisms, M.P. 260–262° C. (recrystallized from acetone-ether).

IR: $\nu_{max.}^{CHCl_3}$ 3475 (NH), 3300 (NH), 1724 (CH$_3$COO), 1710 (CONH), 1700 (CONH), 1253, 1025 (CH$_3$COO) cm.$^{-1}$ Analysis.—Calcd. for $C_{23}H_{35}O_4N$ (389.52): C, 70.92; H, 9.06; N, 3.60. Found: C, 70.95; H, 9.10; N, 3.68.

A solution of 380 mg. of dl-3β-acetoxy-17α-methoxy-17β-amino-D-homo-5α-androstan-18-oic acid lactam dissolved in anhydrous toluene (60 ml.) is distilled to remove 10 ml. of the solvent, moisture present being expelled azeotropically. To this solution are added 48 mg. of sodium hydride and the mixture is refluxed for 0.5 hour in an atmosphere of nitrogen with stirring. Then, after a solution of methanesulfonyl chloride (230 mg.) in 10 ml. of anhydrous toluene is added dropwise in the course of 0.5 hour, the mixture is boiled for 2 hours. Adding water (15 ml.) carefully under ice-cooling, the separated organic layer is combined with another 3 chloroform extracts obtained by successive extraction from the water layer, washed with water, and dried over sodium sulfate. The solvent is distilled off and the residue, 470 mg. is acetylated with 3 ml. of acetic anhydride and 5 ml. of pyridine by standing for 1 night, and treated as usual to obtain crude acetate, 473 mg. which forms thin plates, M.P. 249–254° C. of dl-3β-acetoxy-17α-methoxy-17β-amino-D-homo-5α-androstan-18-oic acid lactam N-methane-sulfonate of chloroform, acetone and ether. The mother liquor is concentrated under reduced pressure and the residue, 235 mg., is chromatographed on 8 g. of alumina and the additional crystals, 61.5 ml., are obtained from eluate of petroleum ether-benzene (4:6)-benzene. Total, 307.4 mg.

dl-3β-acetoxy-17α-methoxy-17β-amino - D - homo - 5α-androstan-18-oic acid lactam N-methane-sulfonate, thin long plates, M.P. 260–263° C. from acetone-ether.

IR: $\nu_{max.}^{CHCl_3}$ 1730 (CON, CH$_3$COO); 1356, 1169, 1155, 1141 (SO$_2$N); 1248, 1028 (CH$_3$COO) cm.$^{-1}$ Analysis.—Calcd. for C$_{24}$H$_{37}$O$_6$SN (467.54): C, 61.65; H, 7.98; N, 2.00; S, 6.86. Found: C, 61.45; H, 8.03; N, 2.91; S, 6.89.

The mixture of 30 mg. of dl-3β-acetoxy-17α-methoxy-17β-amino-D-homo-5α-androstan-18-oic acid lactam N-methanesulfonate, 100 mg. of sodium hydroxide, 3.3 ml. of dioxane and 0.65 ml. of water is refluxed in a stream of nitrogen for 1 hr. After cooling, the reaction mixture is neutralized with acetic acid 150 mg., then added with water under cooling and acidified with hydrochloric acid, and the resultant crystals are extracted 3 times with chloroform. The extracts are combined, washed twice with water, dried over sodium sulfate, and evaporated. The residue, 23.2 mg. is recrystallized from acetone and ether to yield 16.8 mg. of dl-3β,17α,17β-trihydroxy-D-homo-5α-androstan-18-oic acid (18→17β) lactone (decomposed under 310° C.). This is a carboxylic acid but seems to form a hemiketal lactone structure in an equilibrium. In the crystal state, this seems to take the hemiketal lactone structure, as a result of IR determination. This compound shows no rise on repeated recrystallization. Leaflets from chloroform-acetone.

IR: $\nu_{max.}^{Nujol}$ 3540, 3265 (OH); 1733 (hemiketal lactone), 1710 (COOH, CO) cm.$^{-1}$ Analysis.—Calcd. for C$_{20}$H$_{30}$O$_4$ (334.44): C, 71.82; H, 9.04. Found: C, 71.82; H, 9.14.

dl-3β,17α,17β-trihydroxy - D - homo - 5α - androstan-18-oic acid (18→17β) lactone is methylated in conventional manner with an etheral solution of diazomethane dissolved in 6 ml. of dioxane to afford 91.8 mg. of crude product, which is recrystallized from acetone-ether to give 82.1 mg. of methyl dl-3β-hydroxy-17-oxo-D-homo-5α-androstan-18-oate, M.P. 186–187° C. The pure crystals of the product repeatedly recrystallized from acetone-ether are prisms, M.P. 193–194° C.

IR: $\nu_{max.}^{Nujol}$ 3487 (OH), 1731 (ester), 1703 (CO), 1415 (CH$_3$CO) cm.$^{-1}$ Analysis.—Calcd. for C$_{21}$H$_{32}$O$_4$ (348.47): C, 72.38; H, 9.26. Found: C, 72.78; H, 9.32.

Thus obtained methyl dl-3β-hydroxy-17-oxo-D-homo-5α-androstan-18-oate is treated with benzoyl chloride in the presence of pyridine to give methyl dl-3β-benzoyloxy-17-oxo-D-homo-5α-androstan-18-oate. To a solution of the latter (430 mg.) in anhydrous tetrahydrofuran (20 ml.) is added dropwise another ether solution of Grignard reagent [prepared from CH$_3$I (1.5 g.), Mg (231 mg.) and anhydrous ether (6 ml.)] with stirring at room temperature. The dropwise addition takes 5 hours. The mixture is stirred at the same temperature for 1 hr., and then refluxed for 1 hr. After chilling, water (5 ml.) and 2 N-hydrochloric acid (10 ml.) are added, and the mixture is extracted 3 times with chloroform. The extract is washed with 2 N-sodium carbonate solution and water, dried over sodium sulfate, and evaporated. To the residue (507.3 mg.) are added benzoyl chloride (730 mg.) and pyridine (5 ml.), and allowed to stand over night at room temperature. Thus obtained crude benzoyl compound (871.7 mg.) is chromatographed on alumina (Woelm II, neutral) (15 g.). From the eluates with petroleum ether-benzene (1:1–1:2) is obtained 3β-benzoyloxy-17α-methyl-17β-hydroxy - D - homo - 5α-androstan-18-oic acid (18→17β) lactone (159.3 mg.) as fine needles, M.P. 246–248° C. (from acetone-ether). From the mother liquor are recovered 17.9 mg. of the product. Total yield: 177.2 mg.

IR: $\nu_{max.}^{Nujol}$ 3070 (aromatic ring), 1767 (lactone), 1717 (aromatic COOH), 1623, 1609, 1589, 1493, 718 (aromatic ring), 1282, 1124 (aromatic COOH) cm.$^{-1}$ IR: $\nu_{max.}^{CHCl_3}$ 1763 (γ-lactone), 1712, 1280, 1122 (aromatic COOH) cm.$^{-1}$ Analysis.—Calcd. for C$_{28}$H$_{36}$O$_4$ (436.57): C, 77.03; H, 8.31. Found: C, 77.07; H, 8.31.

The benzoyl compound (41 mg.) methanol (2.4 ml.), dioxane (2.5 ml.) and potassium hydroxide solution (61 mg. in 0.5 ml. water) are combined and refluxed for 3 hrs. under nitrogen current. Then the solution is acidified with conc. hydrochloric acid under ice-cooling, and extracted 3 times with chloroform. The extract is washed with 2 N-sodium carbonate solution and water, dried over sodium sulfate, and evaporated. The residue is recrystallized from acetone-ether to give 3β,17β-dihydroxy-17α-methyl-D-homo-5α-androstan - 18 - oic acid (18→17β) lactone (21.3 mg.) as plates, M.P. 225–226° C. From the mother liquor are obtained an additional 8.4 mg. of the product.

IR: $\nu_{max.}^{Nujol}$ 3530 (OH), 1746 (lactone) cm.$^{-1}$

Analysis.—Calcd. for C$_{21}$H$_{32}$O$_3$ (332.47): C, 75.86; H, 9.70. Found: C, 75.67; H, 9.63.

To a well-stirred and ice-cooled solution of 3β-benzoyloxy-17α-methyl-17β-hydroxy - D - homo - 5α - androstan-18-oic acid (18→17β) lactone (148 mg.) in anhydrous tetrahydrofuran (10 ml.) is added a 0.248 M lithium aluminum hydride solution (in ether) (1.8 ml.) and the mixture is refluxed for 3 hrs. After cooling, 0.88 M potassium sodium tartrate (7 ml.) and 0.25 M tartaric acid (5 ml.) are added, and the mixture is extracted with chloroform. The extract is washed with water, dried over Na$_2$SO$_4$, and evaporated. The residue (134.4 mg.) is dissolved in triethyleneglycol (2.8 ml.), and potassium hydroxide (207 mg.) and 80% hydrazine hydrate (0.38 ml.) are added. The mixture is heated at 120–140° C. for 0.5 hr., and then at 210–220° C. for 2.5 hrs.

After cooling, the mixture is poured into ice-water, and extracted with chloroform. The extract is washed with water, 2 N hydrochloric acid, 2 N sodium carbonate and water in turn, dried over Na$_2$SO$_4$ and evaporated. The residue (106.3 mg.) is chromatographed on alumina (Woelm II, neutral) (4 g.). The eluates with benzene-chloroform (1:2)-chloroform is recrystallized from acetone to afford dl-17a-methyl-D-homo-5a-androstan-3β,17-diol (6 mg.) as needles. M.P. 224–228° C.

Acetylation gives dl-3β-acetoxy-17a-methyl-D-homo-5a-androstan-17-ol as prisms. M.P. 142–144/162–163° C. (recrystallized from acetone-ether).

IR (Chloroform): 3625, 3505, 1726, 1249, 1025 cm.$^{-1}$.

Analysis.—Calcd. for C$_{23}$H$_{38}$O$_3$: C, 76.19; H, 10.57. Found: C, 76.22; H, 10.60.

Then the eluates with chloroform-methanol (99:1–95:5) are recrystallized from chloroform-methanol-acetone to afford dl-17a-methyl-D-homo-5a-androstane-3β, 17,18-triol (50.3 mg.) as plates. M.P. 273–278° C.

IR (Nujol): 3485, 3435, 3315, 1040 cm.$^{-1}$.

Analysis.—Calcd. for C$_{21}$H$_{36}$O$_3$: C, 74.95; H, 10.78. Found: C, 74.74; H, 10.68.

(B):

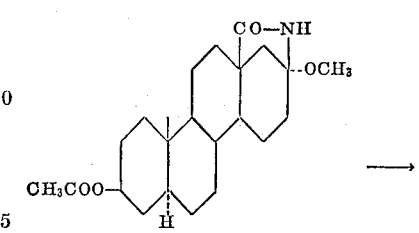

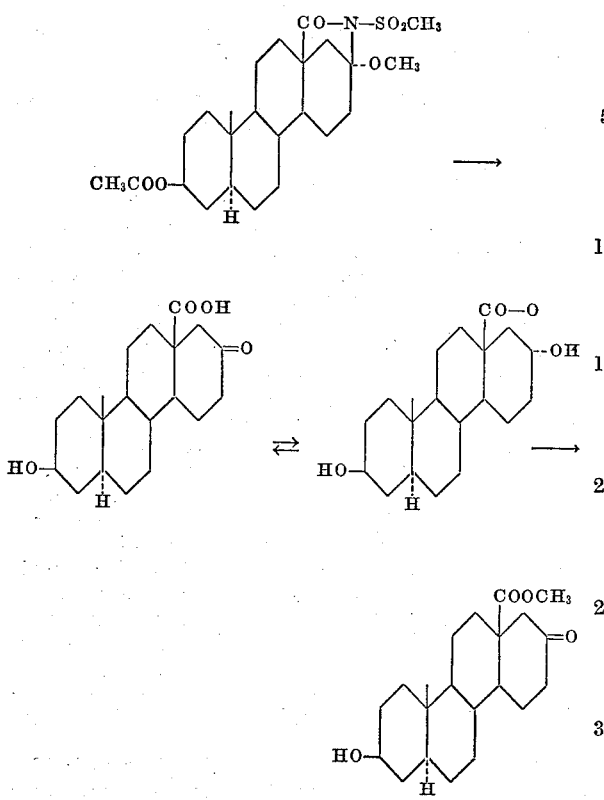

dl-3β-acetoxy-17α-methoxy - 17β - amino-D-homo-5α-androstan-18-oic acid lactam (312.4 mg.) is dissolved in 60 ml. of a mixture of toluene and xylene (1:1), and 185 mg. of methanesulfonyl chloride and 38 mg. of sodium hydride then added. The resultant mixture is refluxed for 2 hours. Adding water (20 ml.) carefully under ice-cooling, the organic layer is combined with another 3 chloroform extracts obtained by subsequent extraction from the water layer, washed with water, and dried over sodium sulfate. After removal of the solvent, the resulting crude product is recrystallized from acetone-ether to afford 201.8 mg. of dl-3β-acetoxy-17α-methoxy-17β-amino-D-homo-5α-androstan-18-oic acid lactam N-methanesulfonate as crystals. M.P. 251–258° C. From the mother liquor, 67.5 mg. more of the product are recovered by the same treatment. Totally, 269.3 mg. of the product are obtained. To the thus obtained dl-3β-acetoxy-17α-methoxy-17β-amino-D - homo-5α-androstan-18-oic acid lactam N-methanesulfonate (1.45 g.), 4.5 g. of sodium hydroxide, 150 ml. of dioxane and 29 ml. of water are added and the mixture then boiled for 3 hrs. in a stream of nitrogen. After being cooled, the mixture is neutralized with 5.4 g. of acetic acid, and extracted 3 times with chloroform. The combined extract is washed twice with 2 N-sodium hydroxide and then twice with water, dried over sodium sulfate, distilled to remove the solvent, the residue recrystallized from acetone-ether to recover 253 mg. of the starting material. M.P. 242–250° C. The above 2 N-sodium hydroxide washings are combined, acidified to Congo grey with concentrated hydrochloric acid under cooling, and the crystals thereby separated are extracted 6 times with chloroform-methanol (9:1). The combined extracts are washed with water, dried over sodium sulfate, distilled to remove the solvent, 863 mg. of residue remaining. The residue is dissolved immediately in dioxane and methylated with diazomethane. The crude ester is recrystallized from acetone-ether to give pure methyl dl - 3β - hydroxy-17-oxo-D-homo-5α-androstan-18-oate (777.8 mg.).

IR (Nujol): 1739, 1711, 1248, 1239, 1028 cm.$^{-1}$.

*Analysis.*—Calcd. for $C_{22}H_{34}O_3$ (346.49): C, 76.26; H, 9.89. Found: C, 76.30; H, 9.77.

To an ether solution of Grignard reagent which is prepared from methyl iodide (2.07 g.) and magnesium (356 mg.) in anhydrous ether (14 ml.) is added dropwise another solution of dl-3β-acetoxy-D-homo-5α-androstan-17-one (513.7 mg.) in anhydrous benzene (15 ml.) with stirring under ice-cooling. The dropwise addition takes 20 mins. The mixture is stirred for 1 hr. at room temperature and ether is distilled off. After addition of anhydrous benzene (30 ml.), the mixture is refluxed for 2.5 hrs. Then the mixture is ice-cooled, N-hydrochloric acid (20 ml.) is added and the mixture is extracted 5 times with chloroform-methanol (3:1). The extract is washed twice with a half-saturated aqueous solution of sodium sulfate, dried over anhydrous sodium sulfate, and evaporated. To the residue (623.9 mg.) are added acetic anhydride (4 ml.) and dry pyridine (5 ml.) and allowed to stand overnight at room temperature. Thus obtained crude acetate (671.6 mg.) is recrystallized from acetone-ether to give 17α-methyl-D-homo-androstan-3β, 17β-diol-3β-acetate (291.1 mg.) as prisms. M.P. 142–144/162–163° C. (it melts once at 142–144° C., then solidifies and melts again at 162–163° C.). Then, 151.2 mg. more of the product are obtained from the mother liquor.

EXAMPLE 3

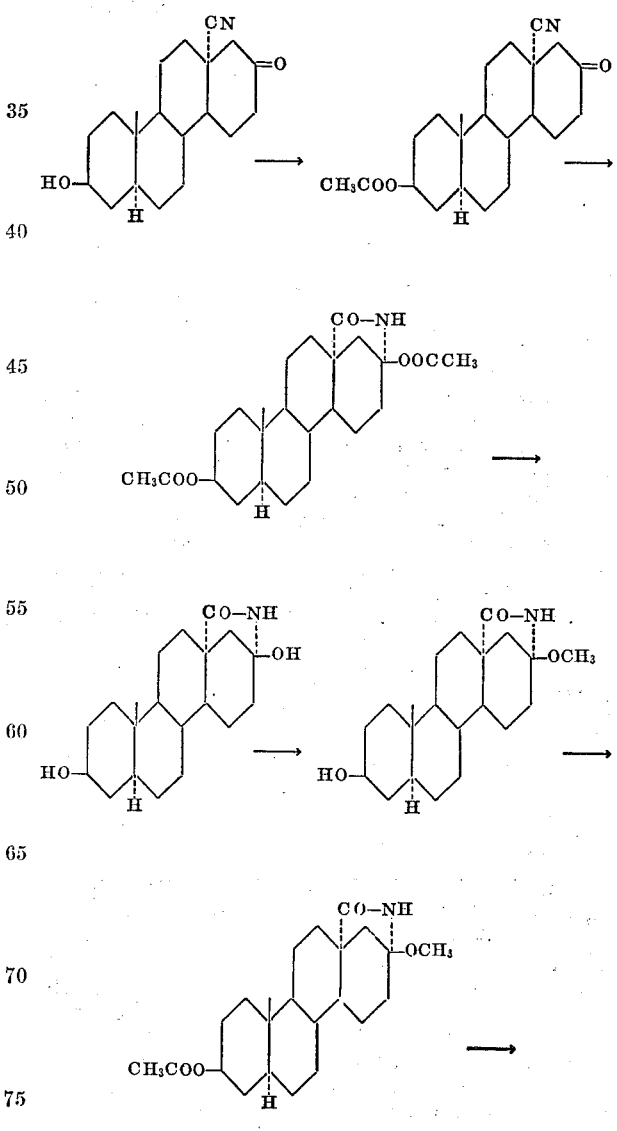

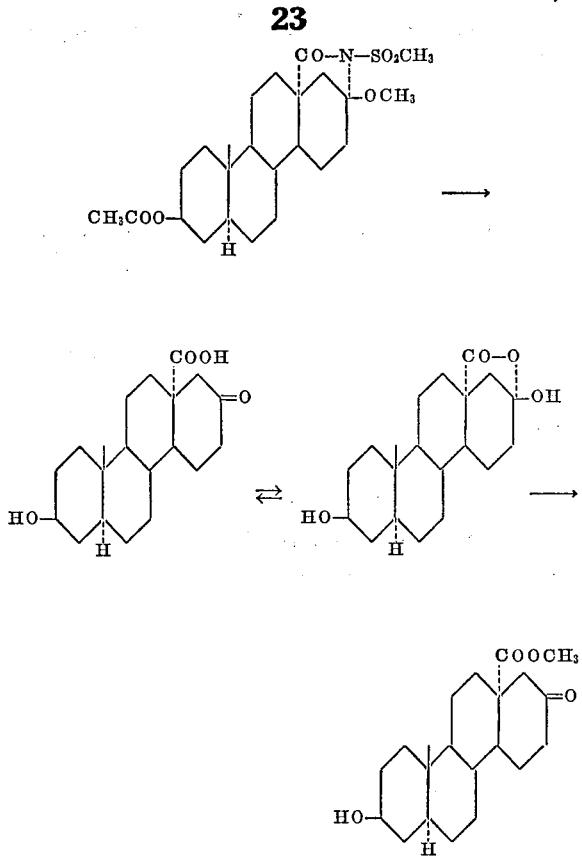

In the same manner as in Example 2(A), dl-3β-hydroxy - 13α - cyano-D-homo-5α-androstan-17-one is converted through dl-3β-acetoxy-13α-cyano-D-homo-5α-androstan-17-one and dl-3β,17β-diacetoxy - 17α - amino - D-homo-5α,13α-androstan-18-oic acid lactam into dl-3β,17β-dihydroxy - 17α - amino-D-homo-5α,13α-androstan-18-oic acid lactam.

To a solution of 428 mg. of crude dl-3β,17β-dihydroxy-17α-amino-D-homo-5α,13α-androstan-18-oic acid lactam in 8 g. of dried methanol there are added 14 g. of 48% (by weight) methanolic hydrochloric acid and the mixture is allowed to stand for 1 night at room temperature. After removing methanol at a reduced pressure, the residue is treated with water and extracted with chloroform-methanol (4:1) for 3 times. The extracts are combined, washed with 2 N-sodium carbonate and then water, dried over sodium sulfate, the solvent distilled to give 451 mg. of the crude product. This is recrystallized from chloroform-methanol to give dl-3β-hydroxy-17β-methoxy-17α-amino-D - homo-5α,13α - androstan-18-oic acid lactam as small prisms of M.P. 297–299° C. (177 mg.). Additional crystals 49.1 mg. are obtained by further treatment of mother liquor.

dl - 3β - hydroxy-17β-methoxy-17α-amino-D-homo-5α, 13α-androstan-18-oic acid lactam.

IR: $\nu_{max.}^{CHCl_3}$ 3615 (OH), 3425 (NH), 1703 (CONH) cm.$^{-1}$

Analysis.—Calcd. for $C_{21}H_{33}O_3N$ (347.48): C, 72.58; H, 59.57; N, 4.03. Found: C, 72.31; H, 9.39; N, 4.24.

Thus obtained methyl ether, 122 mg. is acetylated by allowing it to stand with 6 ml. of acetic anhydride and 9 ml. of pyridiene at room temperature overnight. Crude acetate thereby obtained, 171 mg. is recrystallized from acetone-ether to give 102.5 mg. of 3β-acetoxy-17β-methoxy - 17α-amino-D-homo-5α,13α-androstan-18-oic acid lactam as prisms, M.P. 224–225° C. Additional product (13.0 mg.) is recoverd from mother liquor.

The product is purified by further recrystallization from acetone-ether to give prisms, M.P. 237–240° C.

IR: $\nu_{max.}^{CHCl_3}$ 3424, 3241 (NH); 1727 (CH$_3$CO), 1708 (CONH); 1252, 1028 (CH$_3$CO) cm.$^{-1}$ Analysis.—Calcd. for $C_{23}H_{35}O_4N$ (389.52): C, 70.92; H, 9.06; N, 3.60. Found: C, 70.88; H, 9.05; N. 3.53.

3β - acetoxy - 17β-methoxy-17α-amino-D-homo-5α,13α-androstan-18-oic acid lactam, 275 mg. is dissolved in 55 ml. of dry xylene, dehydrated azeotropically, mixed with 40 mg. of sodium hydride, and then boiled for 1 hr. in a stream of nitrogen under stirring. To the reaction mixture is added a solution of 190 mg. of methanesulfonyl chloride in 10 ml. of dry xylene and further refluxed for 3 hrs. After cooling, the resulting mixture is added with water and extracted with chloroform. After drying, the solvent is distilled off. The residue, 329 mg. is acetylated with 3 ml. of acetic anhydride and 5 ml. of pyridine at room temperature by allowing to stand over night. The crude acetate, 319 mg. obtained in conventional manner, is chromatographed on 9 g. of alumina, eluted with petroleum ether-benzene (6:4)-benzene-chloroform (7:3) and the product from the eluates recrystallized from acetone-ether to give 159 mg. of 3β-acetoxy-17β-methoxy-17α-amino-D-homo-5α-13α-androstan-18-oic acid lactam N-methanesulfonate as crystals, M.P. 206–212° C. Further, 40.2 mg. of 3β - acetoxy-17β-methoxy-17α-amino-D-homo-5α,13α-androstan-18-oic acid lactam is recovered by elution with benzene-chloroform (4:6).

3β - acetoxy - 17β-methoxy-17α-amino-D-homo-5α,13α-androstan-18-oic acid lactam N-methanesulfonate, cubic crystals from acetone-ether, M.P. 206–212° C.

IR: $\nu_{max.}^{CHCl_3}$ 1730 (CON, CH$_3$COO); 1360, 1173 (SO$_2$N); 1261, 1028 (CH$_3$COO) cm.$^{-1}$ Analysis.—Calcd. for $C_{24}H_{37}O_6SN$ (467.54): C, 61.63; H, 7.98; N, 3.00; S, 6.86. Found: C, 61.82; H, 8.13; N, 3.20; S, 6.61.

The mixture of 120 mg. of the mesylate, 10 ml. of dioxane, 400 mg. of sodium hydroxide and 2.5 ml. of water is refluxed for 1 hr. in a stream of nitrogen. The reaction mixture is cooled, neutralized with 0.5 ml. of acetic acid, concentrated under reduced pressure, acidified with concentrated hydrochloric acid to Congo grey and extracted 3 times with chloroform. The combined extract is washed with water, dried over sodium sulfate and distilled to remove the solvent to give the crude crystals, which are recrystallized from chloroform-acetone-ether to obtain 76.7 mg. of dl-3β-hydroxy-17-oxo-D-homo-5α,13α-androstan-18-oic acid as prisms, M.P. 250–254° C. The additional crystals, 0.9 mg. are obtained from the mother liquor. Total yield is 77.6 mg. dl-3β-hydroxy-17-oxo-D-homo-5α, 13α-androstan-18-oic acid, M.P. 251–255°, C./300° C. (with decomposition) from chloroform-acetone-ether.

IR: $\nu_{max.}^{Nujol}$ 3525 (OH), 2500–2700 (COOH); 1711 (CO), 1691 (COOH) cm.$^{-1}$ Analysis.—Calcd. for $C_{20}H_{30}O_4$ (333.44): C, 71.82; H, 9.04. Found: C, 71.46; H, 9.07.

The carboxylic acid obtained above, 43.7 mg., is methylated with diazomethane in conventional manner and the resulting crude ester, 44.1 mg. is recrystallized from acetone-ether to give 36.7 mg. of methyl dl-3β-hydroxy - 17 - oxo - D - homo-5α,13α-androstan-18-oate as prisms, M.P. 154–158° C.

Methyl dl-3β-hydroxy-17-oxo-D-homo-5α,13α - androstan-18-oate prisms, M.P. 164–167° C. from acetone-ether.

IR: $\nu_{max.}^{CHCl_3}$ 3629 (OH), 1728 (ester), 1710 (CO), 1142 (ester) cm.$^{-1}$ Analysis.—Calcd. for $C_{21}H_{32}O_4$ (348.47): C, 72.38; H, 9.26. Found: C, 72.06; H, 9.29.

What is claimed is:

1. The method of preparing a compound having the moiety

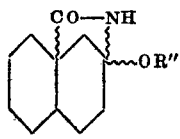

which comprises subjecting the corresponding compound having the moiety

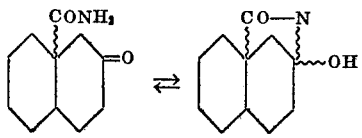

to the action of an etherifying agent or an esterifying agent, R" representing the radical of such agent.

2. The method of preparing a compound having the moiety

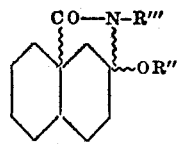

wherein R" is as defined in claim 1 which comprises subjecting the corresponding compound having the moiety

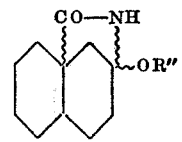

to the action of a sulfonyl halide, R''' being the radical of said sulfonyl halide.

No references cited.

NICHOLAS S. RIZZO, *Primary Examiner.*
JOSE TOVAR, *Assistant Examiner.*